United States Patent [19]

Kranz et al.

[11] Patent Number: 4,784,598

[45] Date of Patent: Nov. 15, 1988

[54] DRYWALL TOOL

[76] Inventors: Kraig A. Kranz, 5229 W. 111th St., Bloomington, Minn. 55437; Kenneth J. Kranz, 10549 Maryland Cir., Bloomington, Minn. 55438; Kasey C. Kranz, 14002 Princeton Ave., Savage, Minn. 55378

[21] Appl. No.: 48,382

[22] Filed: May 11, 1987

[51] Int. Cl.[4] .......................... B29C 67/00; B05C 1/16; B05C 17/10

[52] U.S. Cl. .................................... 425/458; 15/105.5; 15/235.4; 15/245

[58] Field of Search .......... 425/458; 15/104 R, 104 S, 15/105, 105.5, 210 R, 235.3, 245; 4/286, 293; 1/235.4, 245

[56] References Cited

U.S. PATENT DOCUMENTS

| | | | |
|---|---|---|---|
| 1,646,112 | 10/1927 | Schacht | 4/293 |
| 1,937,441 | 11/1933 | Schacht | 4/293 |
| 2,065,886 | 12/1936 | Clift | 15/245 |
| 3,676,888 | 7/1972 | Akers | 15/245 |
| 4,097,951 | 7/1978 | Hurtt | 425/458 |
| 4,654,919 | 4/1987 | Liberman | 15/245 |

FOREIGN PATENT DOCUMENTS

| | | | |
|---|---|---|---|
| 205723 | 12/1956 | Australia | 15/104 S |

*Primary Examiner*—Willard Hoag

*Attorney, Agent, or Firm*—Merchant, Gould, Smith, Edell, Welter & Schmidt

[57] ABSTRACT

A tool for applying drywall compound to a drywall joint is disclosed. The tool includes an application member of resilient flexible material. The member has a generally flat application surface and an arcuate application edge. The application edge and the thickness of the application member are selected for a central portion of the edge to be urged against a joint defined by contiguous flat drywall sheets. The application surface on opposite sides of the central portion flex to define a smooth continuous surface from the central portion to points on the drywall sheets spaced from the joint. The tool urges drywall compound within the joint to assume a smooth surface filling the joint and fanned away from the joint into smooth continuity with the drywall sheets.

9 Claims, 2 Drawing Sheets

DRYWALL TOOL

BACKGROUND OF THE INVENTION

I. Field of the Invention

This application pertains to a tool for use in the construction trades. More particularly, this application pertains to a tool for use in applying drywall compound to a drywall joint.

II. Background of the Invention

In the construction trades, drywall (also called sheet rock or blue board) is commonly used to finish interior walls as an economical alternative to lathe and plaster interior walls. In drywall installation, a plurality of dry wall sheets (commonly 4'×8') are fastened to wall studs and ceiling joints by screws or nails. Contiguous drywall sheets define a joint which must be filled before the drywall can receive a finished coat of paint or wall paper.

Basically, there are three types of drywall joints. The first is a joint formed by contiguous sheets of drywall which lie in the same plane. The second is an exterior corner joint formed by two sheets of drywall abutted together in a generally convex configuration. The third is an interior corner joint formed by two sheets of drywall being joined in a generally concave configuration. In finishing all of the above joints, a drywall compound is used. Drywall compound is a putty-like material which is forced into the joint and feathered out onto the drywall sheets. After the compound drys, it is either sanded or sponge wiped until it is smoothed into the sheets and the joint is completely covered. Frequently, due to shrinkage of the drywall compound, several coats of drywall compound are required for finishing each joint.

In finishing a flat joint, the drywall compound is applied with a wide blade putty knife which, as it moves along the length of the joint, urges drywall compound into the joint and smooths out the drywall compound into the surfaces of the contiguous drywall sheets. A common flat joint includes a first layer of drywall compound, a layer of drywall tape and one or more successive layers of drywall compound.

In finishing exterior corners, a metal bead edge is commonly fastened to the corner and drywall compound is applied to both sides of the bead edge by a wide bladed putty knife which smooths out the surface of the compound between the edge of the metal bead and a flat surface of the drywall sheet.

Particular problems arise when finishing an interior corner. Such a joint is commonly finished by applying a first coat of drywall compound and then a layer of drywall tape followed by one or more successive layers of drywall compound.

In the trade, it is difficult to provide a nice, smooth application of drywall compound on an interior joint. In conventional construction, interior walls meet at a 90° angle. For such 90° joints, a special tool is available which includes two rigid blades joined at a 90° angle. This tool is urged into the 90° corner defined by the drywall sheets and smooths out the drywall compound and drywall tape until it assumes the desired 90° angle finishing the joint.

Building designs frequently deviate from the standard 90° interior corner. The design of the building may call for interior corners having angles significantly greater or less than 90°. In such circumstances, the conventional interior corner tool cannot be used. Instead, the prior art of drywall finishing required the tradesmen to use a long bladed putty knife to apply the drywall compound and the drywall tape. This required two passes for each application. In each pass, one end of the blade would be positioned within the corner defined by the drywall sheets and the blade would be drawn along the length of the joint to smooth out the compound on one of the drywall sheets. The next pass required placing the end of the blade in the edge of the joint and smoothing out the compound on the other drywall sheet. This two-step process frequently resulted in a wavy line being formed down the length of the joint. This wavy line is attributable to the fact that the tradesman does not always draw the putty knife in a precisely straight line. The existence of this line required time consuming efforts to smooth out the line or otherwise make sure that the line was not formed. However, this is time consuming and expensive. It has long been recognized that it would be desirable to have a tool which could be used to apply compound to the interior joints with a single application and avoid the need to take time-consuming efforts to smooth out an interior joint.

SUMMARY OF THE INVENTION

According to a preferred embodiment of the present invention, a tool for applying drywall compound to a drywall joint is disclosed. The tool includes an application member of resilient flexible material and having a generally flat application surface. The member has an arcuate application edge which joins a periphery of the application surface with an operator engageable surface. The edge is sized for a central portion of the edge to be urged toward a joint defined by contiguous flat drywall sheets. As the application member is urged into the joint, the application surface on opposite sides of the central portion flex to define a smooth continuous surface from the central portion to points on the drywall sheets spaced from the joint. Accordingly, drywall compound within the joint is urged by the continuous smooth application surface to assume a smooth surface filling the joint and fanned away from the joint into smooth continuity with the drywall sheets.

DESCRIPTION OF THE PREFERRED EMBODIMENT

Referring now to the several figures in which identical parts are numbered identically throughout, a description of the present invention will now be given with respect to a preferred embodiment.

Figure 3:
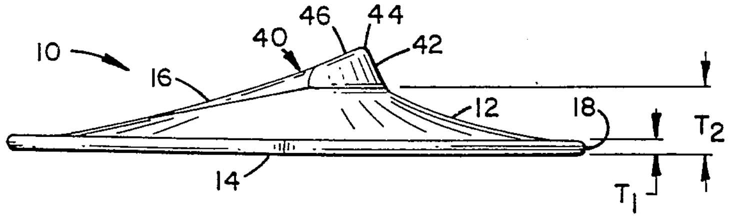
FIG. 3 is a side view taken in elevation of the tool of the present invention.
Figure 4:
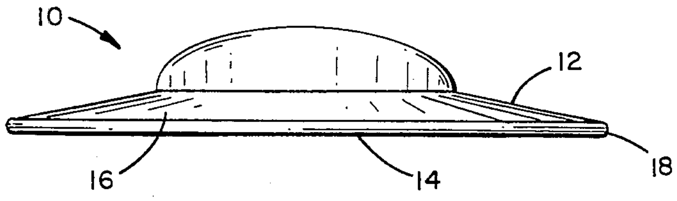
FIG. 4 is a front view taken in elevation of the tool of the present invention.

In the figures, a tool of the present invention is shown generally at 10. The tool includes a base or application member 12 which is generally disk-shaped. More particularly the application member 12 has a flat application surface 14 and a spaced apart operator engaging surface 16. The application surface 14 and spaced apart operator engaging surface 16 are joined by a periphery edge 18. The thickness of the member 12 varies from a minimum thickness, $T_1$, at edge 18 to an enlarged maximum thickness, $T_2$, at the center of the member 12 (FIG. 3).

Figure 1:
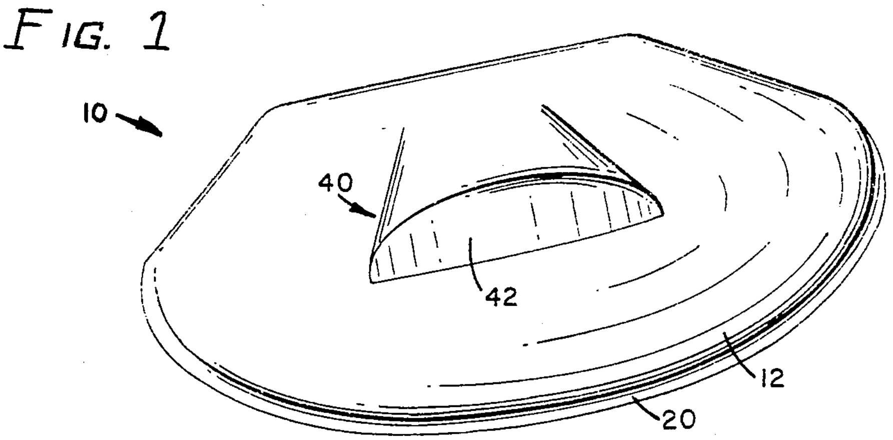
FIG. 1 is a perspective view of the tool of the present invention.
Figure 2:
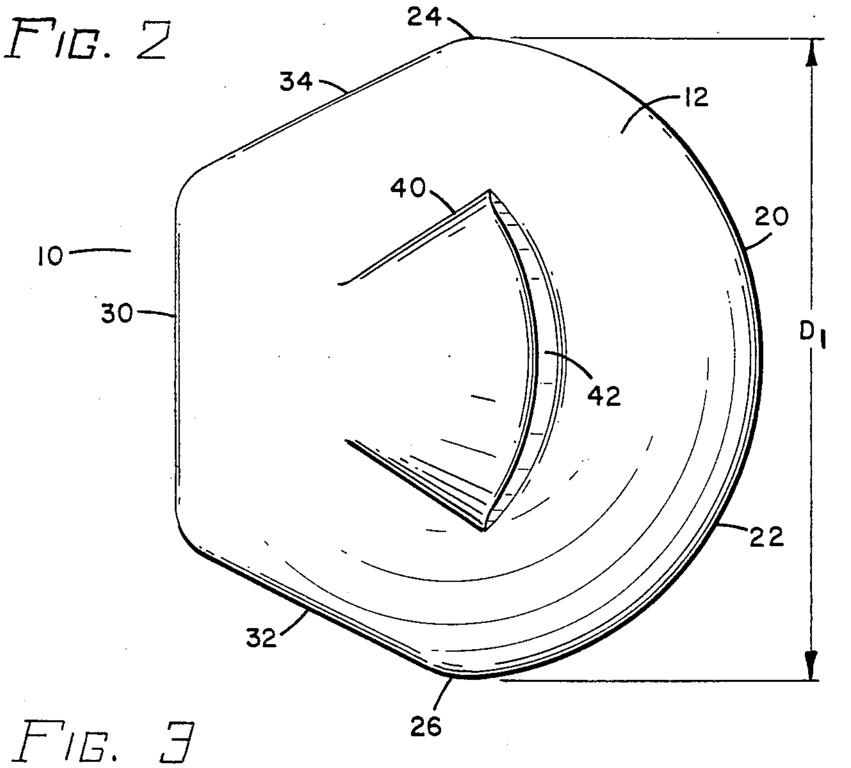
FIG. 2 is a top plan view of the tool of FIG. 1.

Shown best in FIG. 2, the application member is configured to present a semi-circular arcuate forward edge portion 20. The forward edge includes a central portion 22 and diametrically opposed side portions 22 and 24 which are disposed at 90° on both sides of central portion 22 (FIG. 2). For each of convenience, side portion 24 will be referred to as the left side portion and side portion 26 will be referred to as the right side portion.

Shown in FIG. 2, the application member 12 with peripheral edge 18 includes a rear edge 30 which is diametrically opposed to central portion 22. Rear edge 30 extends generally parallel to a dimension $D_1$ between left side portion 24 and right side portion 26. Edge 30 is joined to side portion 26 by right side edge 32. Similarly, rear edge 30 is joined to left side portion 24 by left side edge 34. The longitudinal dimension of rear edge 30 is less than dimension $D_1$. Accordingly, left and right side edges 34,32 taper inwardly from side portions 24,26 to rear edge 30.

Centrally disposed on operator engaging surface 16 is a handle 40. Handle 40 includes a digit engaging surface 42 which is generally extending upwardly from surface 16 opposing central portion 22. Surface 42 terminates at a free edge 44 with a ramp surface 46 extending from free edge 44 and tapered toward rear edge 30.

In use of the tool 10, it is intended for an operator to grip the tool 10 with the fingers of the hand (excluding the thumb) engaging digit surface 44 and with rear edge 30 received within the palm of the hand and with the thumb of the operator opposing application surface 14. The operator would then urge central portion 22 against a joint defined by contiguous drywall sheets. The member 12 should flex under the urging of the operator such that central portion 22 is closely adjacent the joint of the drywall sheets and the side portions 24,26 abut the drywall sheets. In this position, the application surface 14 provides a continuous smooth surface for blending drywall compound from the joint to the drywall sheets.

Preferably, the tool should be integrally molded of a material which is stiff enough to take repeated flexing at central portion 22 without cracking of the material. If the application member 12 were to crack at central portion 22, drywall compound would ooze through the crack leaving an unsightly raised area on the drywall compound which would have to be sanded or otherwise smoothed out.

The hardness or stiffness of the material is selected for the material to be flex enough to form a corner and urge drywall compound into a joint. If the material is significantly stiffer than this hardness, the material will not be sufficiently flexible. However, if the material is significantly softer, central portion 22 can easily wear with use and crack and leave the unsightly line in the drywall compound. A preferred material is styrene butadiene rubber. Further, in order to achieve sufficient flexibility, it is desired that the thickness $T_1$ of the member at the arcuate edge 20 will be about 3/32 of an inch.

Another important dimension for the application member is the diameter of arcuate surface 20 (measured as the distance $D_1$ between side edge portions 24,26). We have found that a dimension $D_1$ of about $5\frac{1}{2}$ inches is a preferred dimension. We have found that a dimension of 5 inches will not provide sufficient area to cover a wide angled corner and properly feather joint compound from the joint to the drywall surface. For a tool having a dimension $D_1$ greater than $5\frac{1}{2}$ inches, we have found that such a tool does not work well in narrow corners (corners defining angles significantly less than 90°) since the tool does not fit easily into the corner.

By selecting handle 40 so that digit engaging surface 42 is spaced from central portion 20 a distance sufficient to provide desired flexibility of central portion 22 within a joint, surface 42 will be at a preferred position to facilitate easy use of the tool by an operator. Also, it is desired to have surface 42 spaced from rear edge 30 a distance sufficient for rear edge 30 to rest comfortably within the palm of an operator's hand with the operator's finger opposing surface 14. To accomplish this, the distance from surface 42 to a handle trailing edge 43 is preferably about 2 inches and the distance from surface 42 to rear edge 30 is preferably about $3\frac{1}{2}$ inches. Surface 42 is preferably spaced from central portion 22 about $1\frac{3}{4}$ inches. Also, a lower edge 41 of surface 42 is spaced from application surface 14 so that thickness $T_2$ is about 3/8 of an inch such that engaging surface 16 tapers from lower edge 41 to peripheral edge 18.

Figure 5:
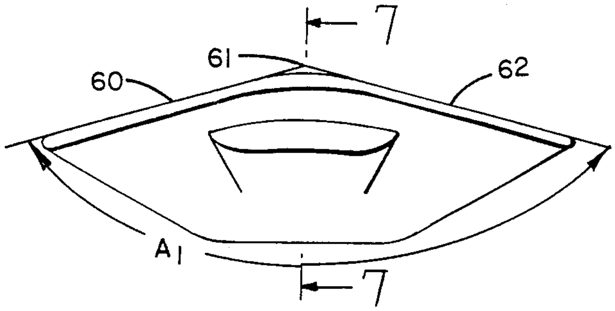
FIG. 5 is a view showing use of the tool with an interior joint greater than 90°.

With the apparatus as described, an operator can use the tool 10 to apply drywall compound to a drywall joint. In FIG. 5, two sheets of drywall 60 and 62 abut to define a drywall joint 61. The drywall sheets 60,62 are held to define an included angle $A_1$ of substantially greater than 90°. To apply joint compound to joint 61, an operator can use tool 10 to place a quantity of drywall compound on application surface 14 and then urge tool 10 against joint 61 as shown in FIG. 5. With central portion 22 urged against joint 61, side portions 24,26 abut walls 60,62 and the application surface 14 forms a continous surface from joint 61 to points 24,26. This deformation of the application surface 14, causes drywall compound to assume the shape of surface 14 and an operator simply draws the tool 10 along the length of joint 61 with the drywall compound being forced to assume the shape of application surface 14. Accordingly, in a single pass, the drywall compound is urged into joint 61 and smoothed from joint 61 onto drywall sheet 60,62 without the need for multiple passes as was the prior art method using conventional rigid straight putty knives. Also, the smooth shape of application surface 14 at central portion 22 insures there is no ridge formed in the drywall compound at joint 61. As a result, sanding or other finishing is left to a minimum.

Figure 6:
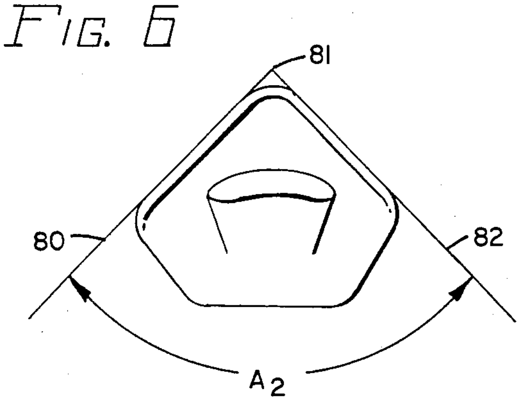
FIG. 6 is a view showing use of the tool with an interior joint of about 90°.

With reference to FIG. 6, the tool 10 is shown with use for a joint 81 formed by two drywall sheets 80 and 82 which are disposed at an angle $A_2$ of about 90°. Due to the dimensions of the tool 10 and the flexibility of its material, the central portion 22 is once against urged against joint 81 with the application surface 14 defining a smooth continuous surface to feather a drywall compound against drywall sheets 80 and 82.

Figure 7:
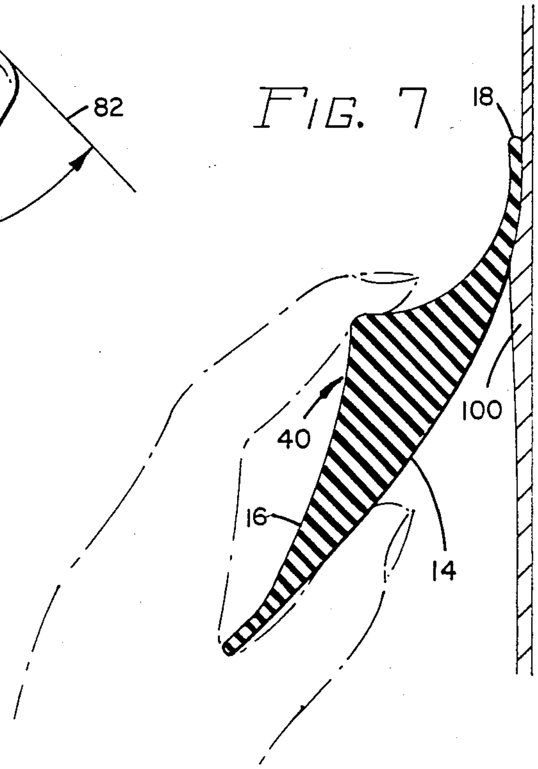
FIG. 7 is a view taken generally along line 7—7 of FIG. 5.

In FIG. 7, the apparatus is shown in use being gripped by an operator and spreading out a volume of drywall compound 100. As shown in FIG. 7, the operator's thumb is opposing surface 14 and the operator's remaining fingers are gripping handle 40.

From the foregoing, it has been shown how the objects of the invention have been obtained in the preferred manner. However, modifications and equivalents of the disclosed concepts, such as readily occur to those skilled in the art, are intended to be included in the scope of this invention. Thus, the scope of the invention is intended to be limited only by the scope of the claims as are, or may hereafter be, appended hereto.

We claim:

1. A tool for applying drywall compound to a drywall joint, said tool comprising:
   an application member of resilient flexible material, said member having a generally flat application surface and an edge joining a periphery of said application surface with an operator engaging surface spaced from said application surface by a predetermined dimension;
   said edge including an arcuate portion and a diametrically opposed generally straight portion;
   said edge sized and said dimension selected for a central portion of said arcuate portion to be urged against a joint defined by contiguous flat drywall sheets with said application surface of opposite side of said central portion flexing to defined a smooth continuous surface from said central portion to points on said drywall sheets spaced from said joint;
   handle means disposed on said operator engaging surface between said arcuate portion and said straight portion, a distance between said handle means and said straight portion selected for said straight portion to rest against an operator's palm with said operator's fingers engaging said handle means and with an operator's thumb opposing said application surface;
   whereby drywall compound within said joint is urged to assume a smooth surface filling said joint and fanned away from said joint into smooth continuity with said drywall sheets.

2. A tool according to claim 1 wherein said application member is formed of molded styrene butadiene rubber.

3. A tool for applying drywall compound to a drywall joint, said tool comprising:
   an application member of flexible resilient material and having a flat application surface and a spaced apart operator engaging surface, said application surface joined to said engaging surface by a peripheral edge;
   said peripheral edge including an arcuate portion having a central portion and symmetrical side portions;
   said peripheral edge further including a generally straight rear portion disposed opposite said central portion, said peripheral edge including side walls extending from said rear portion to said side portions, said rear portion having a length less than a distance between said side portions adjacent said arcuate portion;
   handle means disposed on said operator engaging surfaces between said arcuate portion and said rear portion, a distance between said handle means and said rear portion selected for said rear portion to rest against an operator's palm with said operator's fingers engaging said handle means and with an operator's thumb opposing said application surface;
   said member having a thickness selected for said central portion to be urged against a joint defined by contiguous flat drywall sheets with said side portions flexing for said application surface to define a continuous smooth surface from said central portion to points of contact between said drywall sheets and said side portions;
   whereby drywall compound within said joint is urged to assume a smooth surface filling said joint and fanned away from said joint into smooth continuity with said drywall sheets.

4. A tool according to claim 3 wherein said application member is formed from flexible resilient material having a hardness selected for said material to be urged against a joint without cracking of said material peripheral edge.

5. A tool according to claim 3 wherein said maximum distance is between 5 and 6 inches.

6. A tool according to claim 1 wherein said handle means includes a raised ridge opposing said arcuate portion.

7. A tool according to claim 3 wherein said handle means includes a raised ridge opposing said arcuate portion.

8. A tool according to claim 1 wherein said arcuate portion extends about an angle of approximately 180°.

9. A tool according to claim 3 wherein said arcuate portion extends about an angle of approximately 180°.

* * * * *

UNITED STATES PATENT AND TRADEMARK OFFICE
CERTIFICATE OF CORRECTION

PATENT NO. : 4,784,598

DATED : November 15, 1988

INVENTOR(S) : Kraig Kranz, et al.

It is certified that error appears in the above-identified patent and that said Letters Patent is hereby corrected as shown below:

Column 5, line 20 "of" should be --on--;

Column 5, line 20 "side" should be --sides--;

Column 5, line 21 "defined" should be --define--.

Signed and Sealed this

Ninth Day of May, 1989

*Attest:*

DONALD J. QUIGG

*Attesting Officer*

*Commissioner of Patents and Trademarks*